Jan. 16, 1968 W. H. MAILER 3,363,835

APPARATUS FOR CONVERTING BINARY CODE INTO PRINTED DECIMAL DATA

Filed Feb. 4, 1964 8 Sheets-Sheet 1

Inventor:
Werner H. Mailer
Gradolph, Love & Rogers
Attorneys

APPARATUS FOR CONVERTING BINARY CODE INTO PRINTED DECIMAL DATA

Filed Feb. 4, 1964 8 Sheets-Sheet 2

Inventor:
Werner H. Mailer
Gradolph, Love & Rogers
Attorneys

Jan. 16, 1968 W. H. MAILER 3,363,835

APPARATUS FOR CONVERTING BINARY CODE INTO PRINTED DECIMAL DATA

Filed Feb. 4, 1964 8 Sheets-Sheet 3

Inventor:
Werner H. Mailer
Gradolph, Love & Rogers
Attorneys

APPARATUS FOR CONVERTING BINARY CODE INTO PRINTED DECIMAL DATA

Filed Feb. 4, 1964

Inventor:
Werner H. Mailer
Gradolph, Love & Rogers
Attorneys

Inventor:
Werner H. Mailer
Gradolph, Love & Rogers
attorneys

APPARATUS FOR CONVERTING BINARY CODE INTO PRINTED DECIMAL DATA

Filed Feb. 4, 1964 8 Sheets-Sheet 6

Inventor:
Werner H. Mailer
Gradolph, Love & Rogers
Attorneys

Inventor:
Werner H. Mailer
Gradolph, Love & Rogers
Attorneys

APPARATUS FOR CONVERTING BINARY CODE INTO PRINTED DECIMAL DATA

Filed Feb. 4, 1964

Inventor:
Werner H. Mailer
Gradolph, Love & Rogers
Attorneys

United States Patent Office 3,363,835

Patented Jan. 16, 1968

3,363,835

APPARATUS FOR CONVERTING BINARY CODE INTO PRINTED DECIMAL DATA

Werner H. Mailer, Chicago, Ill., assignor to Victor Comptometer Corporation, Chicago, Ill., a corporation of Illinois Filed Feb. 4, 1964, Ser. No. 342,399
8 Claims. (Cl. 235—61)

The present invention relates to new and improved apparatus for converting binary code into decimal data which can be printed.

Data of various types may be stored on punched cards or perforated tapes, on magnetic tapes or drums, as retained electrical charges in computers, and in various other ways. The data is read or released in a well known manner according to the technique used in storing it and the resulting code may be translated into usable and understandable information.

A common and widely used binary code is a weighted decimal digit code and it employs indicia corresponding, for example, to the decimal digits one, two, four, and eight, or one, two, two, and four. These digits might be combined to correspond to the numbers of one through nine. When the binary code indicia is translated into the corresponding decimal digit, it is understandable and usable.

It has been proposed to utilize the printing and accumulating features of an electrically powered adding machine to reduce the stored binary code data into visual form and to perform certain arithmetic computations. The known devices for doing this have a complex of linkages to control the mechanical actions of the adding machine which automatically prints the resultant decimal data on a tape. These linkages are permitted movements to limit the mechanical movements of the adding machine slides which enter the decimal value into the accumulator and set the printing mechanism. There is a set of the linkages for each decimal column of units, tens, hundreds, etc. The linkages heretofore used have lineal movement against restoring springs and unless the mechanism is made within exceedingly close tolerances, the potential error is magnified 8 to 1, which is sufficient to introduce an error into the translated decimal data. Furthermore, the mechanical movement of the slides in the adding machine is spring powered and this spring power operates against the spring power of the restoring springs of the translating linkage complex. This can result in a failure of the adding machine slide to move sufficiently rapidly to complete its full stroke before the printing and accumulating portion of the machine cycle is initiated, which will cause the entry of a decimal digit lower in value than that of the corresponding binary code indicia. Some difficulty has been encountered in restoring all portions of the linkages of the previous devices to their initial positions, and consequently false data has been entered on the subsequent operation of the device.

The translating apparatus of the present invention uses an accumulated rotary motion of a plurality of elements corresponding to the code digits of one, two, four, and eight or one, two, two, and four to limit the movement of the number entering slide. The power for the rotary motion is obtained from the springs of the adding machine itself. The plurality of elements are positively restored to their initial position by restoring the slides to their initial position, and this ensures that the translating apparatus is ready for a subsequent operation without any initial error resulting from improper restoration. Furthermore, by the use of rotary rather than lineal motion, the accumulated error in the controlling motion due to manufacture will result in only one-half that error in the controlled motion, which is insufficient to introduce an error into the decimal digit.

It is therefore a principal object of the present invention to provide a new and improved apparatus for converting or translating binary code into decimal data which overcomes the most serious disadvantages of the prior art devices intended for the same purposes.

Another object is to provide a new and improved apparatus for converting or translating binary code data into printed decimal data using a full keyboard type of adding machine wherein the operation of the converting apparatus and adding machine complement each other rather than oppose each other.

Another object is to provide a new and improved apparatus for converting or translating binary code data into decimal data wherein the decimal data made available for use incorporates a minimum of error.

Another object is to provide a new and improved apparatus for converting or translating binary code data into usable decimal data wherein the units corresponding to each binary code bit is a rotary element and is combined with other rotary elements to accumulate the complete decimal digit.

Another object is to provide a new and improved apparatus for converting or translating binary code data into usable decimal data wherein the decoding elements having a rotary rather than a linear motion and customary manufacturing tolerances will introduce no error of measurable significance into the operation of the apparatus or of the recording or calculating apparatus using the decimal data.

Other objects and advantages will become apparent from the following description taken in conjunction with the accompanying drawings, wherein FIG. 1 is a longitudinal sectional view through a typical adding machine of the full keyboard model, on which is mounted a single columnar unit of the apparatus of the present invention for converting binary code data into usable decimal data which may be printed and may be used in arithmetic computations;

Figure 12:
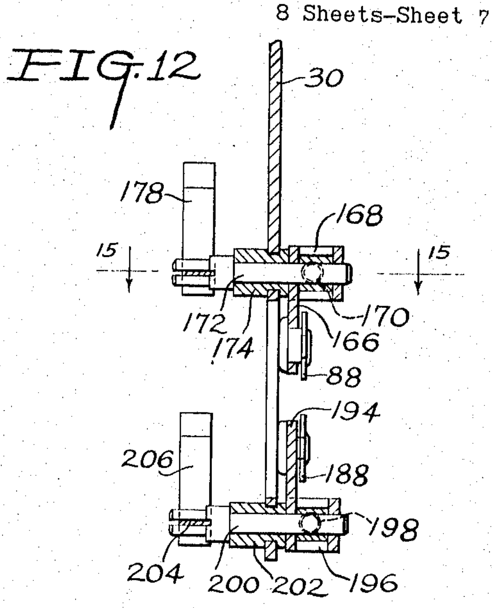
FIG. 12 is an enlarged fragmentary sectional view taken along the line 12—12 of FIG. 11, looking in the direction of the arrows.
Figure 13:
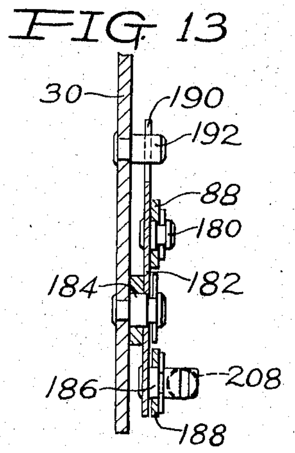
FIG. 13 is an enlarged fragmentary sectional view taken along the line 13—13 of FIG. 11, looking in the direction of the arrows.
Figure 14:
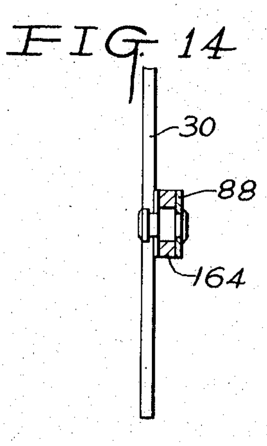
Figure 15:
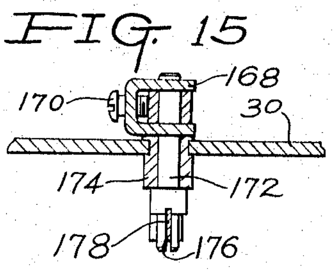
Figure 11:
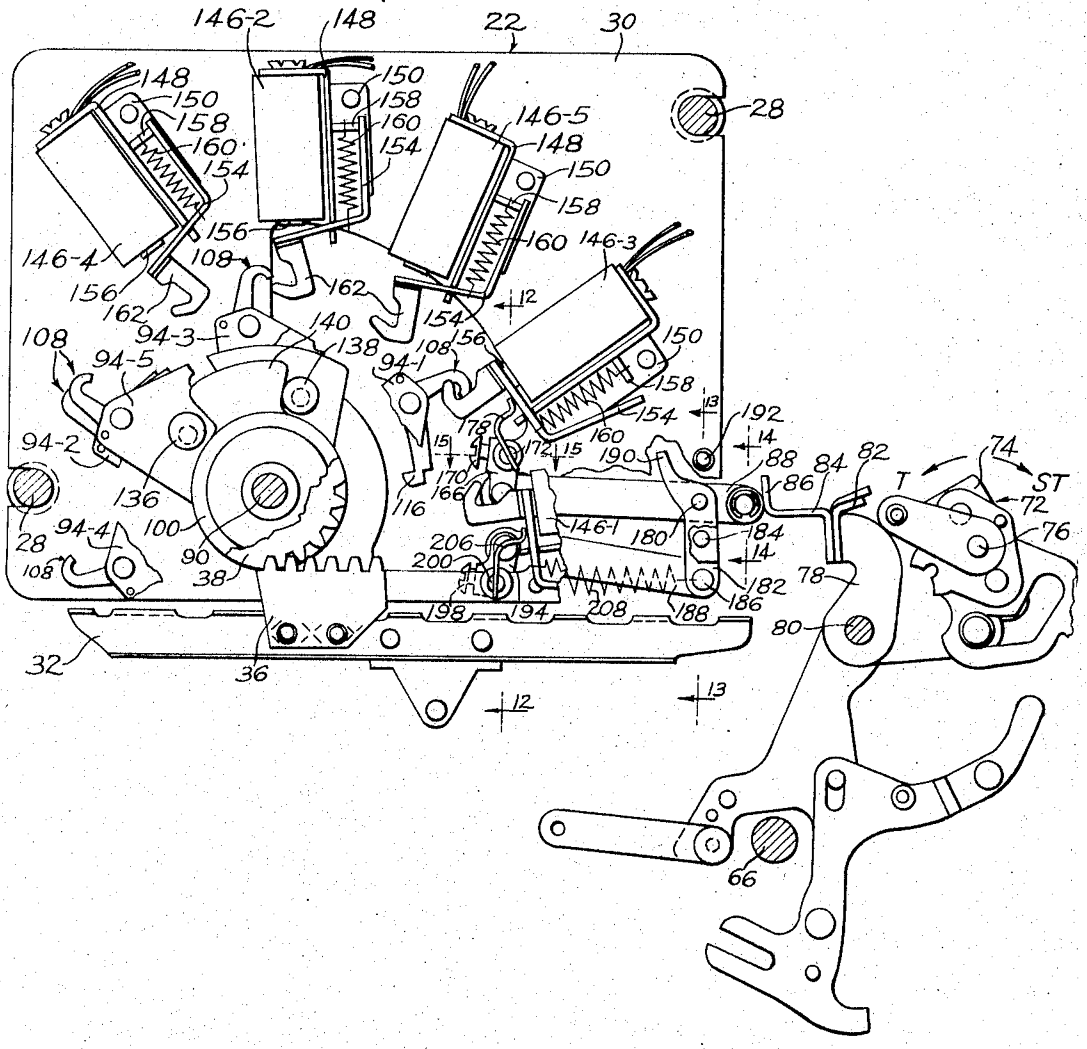
FIG. 11 is a view similar to FIG. 1, showing the total taking slide in the total taking position with the converting or translating unit in the decimal digit 9 position.

FIG. 14 is an enlarged fragmentary sectional view taken along the line 14—14 of FIG. 11, looking in the direction of the arrows; and FIG. 15 is an enlarged fragmentary sectional view taken along the line 15—15 of FIGS. 11 and 12, looking in the direction of the arrows.

The binary code converting and translating apparatus of the present invention is illustrated as used with a full keyboard model electric powered adding machine of the type disclosed in Thomas O. Mehan Patent No. 2,411,050, dated Nov. 12, 1946. It should be appreciated and understood that the conventional keyboard has been removed and a single unit of the converting and translating apparatus substituted for each arithmetic column. Simple and well known electromagnets are used to operate the add and subtract keys or bars, the total and subtotal taking keys, and the keys for whatever other functions are required.

It is also to be understood that the converting and translating apparatus is connected to a tape, card, or drum reader, or some other source of binary code signals, from which it receives appropriate electrical signals to operate the converting and translating apparatus of this invention.

The invention in this case is illustrated in conjunction with a adding machine 20 of the full keyboard type, from which the keyboard has been removed and in place thereof a plurality of converting or translating assemblies 22 are substituted, it being understood that there is an assembly 22 for each column of the machine although only one is illustrated. The adding machine includes a conventional frame 24 having extended side plates 26 between which are rods 28 supporting base plates 30 forming a part of each assembly.

The adding machine includes a stop slide 32 for each column, which is guided in support combs 34 for linear movement only, and it has a rack 36 mounted thereon in engagement with a readout gear sector 38 of the converting and translating assembly 22. The extent of rotational movement permitted the gear sector 38 is determined by the assembly 22 and will be described hereinafter, and this determines the extent of rearward movement of the slide 32.

Each slide 32 is connected to a rack bar 40 which is slotted to be guided on rods 42 supported in the adding machine frame. The rack 40 and the slide 32 to which it is connected are urged rearwardly by a spring 44.

The rack 40 has two sets of rack teeth 46 and 48. The rack teeth 46 are meshed with a gear sector 50 which forms a part of a type carrying sector 52 which cooperates with a platen 54 about which a tape is passed and with an inked ribbon (not shown) for printing the appropriate digits and other indicia on the tape.

The rack teeth 48 are meshed with an adding gear sector 56 and in a known manner it positions an accumulator sector 58, the adding sector and the accumulator sector being mounted on a shaft 60. The accumulator sector is selectively engageable with pinions 62 of an accumulator assembly 64 for entering positive and negative amounts into the acumulator. The accumulator pinions 62 are mounted on a frame 65 for selective movement into and out of engagement with the accumulator sector 58.

The machine includes a main shaft 66 which rotates back and forth through an angle of about 100° in one complete cycle of the machine. It is driven in a known manner by an electric motor through an appropriate one revolution clutch and cams.

On the first half cycle of the adding machine, the main shaft through connecting linkages moves a bail 68 which extends through slot 70 formed in each of the type sectors 52 from the position shown in the lower end of the slot to the upper end thereof (FIG. 1), to condition the machine for movement of the rack bars 40 and stop slides 32 rearwardly when the latter are released. These are released just prior to the end of the first half cycle of the machine and they move rearwardly under the force exerted by the springs 44 to the extent permitted by the position of the readout gear sector 38. The extent of rearward movement determines the value of the number to be entered into the accumulator 64 and that which is printed on the tape from the type sector 52. It is to be noted that during the rearward movement of the rack bars 40, the type sectors 52 are rotated in the counterclockwise direction and the adding gear sector 56 and the accumulator sector 58 are rotated in the clockwise direction.

At the end of the first half cycle of the machine, the accumulator, depending on whether an adding or subtracting function is to be performed, is properly moved into position by engaging one of the pinions 62 with the accumulator sector 58, and the number is printed on the tape. Then the bail 68 is moved from its up position to the position shown in FIG. 1 to restore the type sector 52 to the position shown in FIG. 1, the gear sectors 56 and 58 to the position shown in FIG. 1, and the stop slide 32 and rack bar 40 to their forward positions against the force of the springs 44. During this latter movement the value of the printed number is entered in the accumulator 64. At the end of the cycle the accumulator is disengaged from the accumulator sector 58.

The total and subtotal taking mechanism is of the type disclosed in Thomas O. Mehan Patent No. 2,475,510, dated July 5, 1946, entitled, "Total Taking Control." The mechanism includes a key which is movable to the appropriate total or subtotal taking position, which key is omitted in the illustrations, but when operated, it initiates functioning of a total taking mechanism 72 which is most clearly shown in FIG. 11. In taking a total the accumulator 64 is moved into engagement with the appropriate pinion 62 at the beginning of the first half cycle of the machine to clear the accumulator which is disengaged for the second half of the machine cycle. In taking a subtotal, the accumulator 64 is continued in mesh with the appropriate pinion 62 in order to restore the amount taken and printed as a subtotal. These functions are well known.

The total taking mechanism includes an inverted U-shaped bracket 74 mounted on a pivot 76 and movable in the counterclockwise direction when taking a total and in the clockwise direction when taking a subtotal, as indicated in FIG. 11. The total taking mechanism swings an arm 78 in the counterclockwise direction about its pivot 80. The arm 78 carries a bail 82 which in the adding machine is a key release bail actuated in every cycle of the machine, but in the present disclosure is actuated only by the total taking mechanism 72. A Z-shaped bracket 84 is welded to the bail 82 and has a leg 86 bridging across all of the converting or translating assemblies 22 in a position to move in each assembly a slide 88 forwardly or to the left, as shown in FIG. 11. The slide 88 is mounted on the rear of the plate 30 (FIGS. 1, 9, and 11), and its function in conditioning each of the assemblies 22 for total taking will be explained hereinafter.

Figure 2:
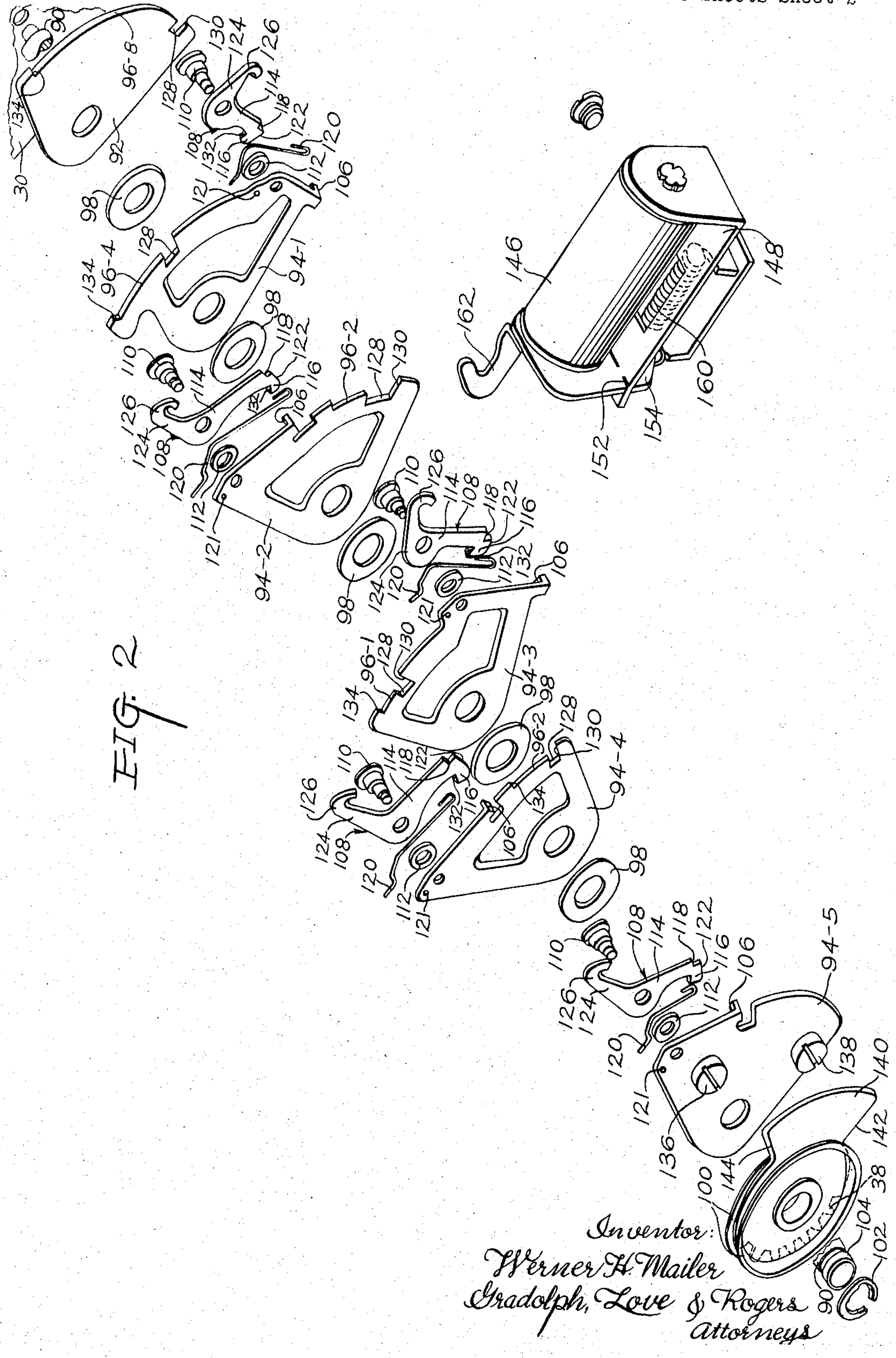
FIG. 2 is an exploded perspective view of the converting or translating assembly illustrating the code digit elements or discs, the transfer means, the latching means, one electromagnet, the readout gear segment, and the common mounting for the code elements.

As seen most clearly in FIG. 2, each of the converting and translating assemblies is mounted on a shaft 90 carried in the base plate 30 and includes a stationary code plate 92 and a plurality of rotatable code discs 94–1, 94–2, 94–3, 94–4, and 94–5. The discs 94, with the exception of 94–5, are cut out to make them lighter, and when rotating they accumulate an angular movement on the shaft 90 equal to the total value of the sensed indicia for the column for which they control the rotated position of the readout gear sector 38.

The stationary code plate 92 has on its periphery a code track 96–8 and the other discs, with the exception of disc 94–5, have code tracks on their peripheries. Disc 94–1 has code track 96–4, disc 94–2 has code track 96–2, disc 94–3 has code track 96–1, disc 94–4 has code track 96–2. The suffix number in each case indicates the value of the code of 1, 2, 2, 4, or 8 so that by proper selection of the discs to be used, the codes of 1, 2, 4, 8, or 1, 2, 2, 4 may be sensed and converted by this apparatus. The code discs 94 are separated from each other and from the stationary code plate by interposed spacers 98 carried on the shaft 90. When the assembly is complete, the discs and spacing washers are in face to face arraignment as is the readout gear sector 38 which is supported between a pair of rim defining plates 100, and the entire assembly is retained in position by C-clip 102 in groove 104 at the forward outer end of the shaft 90 when considered from the position of FIG. 1. The rim defining discs 100 have a radius slightly larger than that of the gear sector 38 and insure proper meshing of the teeth of the gear sector with the teeth of the rack 36 on the stop slide 32.

Referring to FIGS. 2 through 8, it is apparent that the periphery of each of the discs 94 is different from that of its neighbor so as to provide the code track 96 of appropriate length and also to provide for the proper location of a laterally projecting finger 106 which lies across the adjacent stationary code plate 92 or the adjacent rotatable code disc 94, as the case may be, and it is adapted to ride on the code track 96 of the adjacent plate or disc. Each of the rotatable code discs 94 carries a lever 108 pivotally mounted on a stud 110 and spaced from the face of the disc by a washer 112 of the thickness of the spacer 98. The lever 108 has a first arm 114 formed with a latching dog 116 at its outer end and a notch 118 to receive the hook end of a biasing spring 120, the opposite end of which engages under the stud 110 and through a hole 121 in the disc in order to exert a clockwise biasing force on the lever 108. The dog has an outer face 122 which is engaged by the finger 106 of the disc 94 on which the lever 108 is mounted.

The lever 108 has a second arm 124 with a hooked end 126 adapted to be engaged as presently to be described for the purpose of releasing the dog 116 from locking position. The assembly is such that the lever 108 from one disc 94 overlies the code track 96 of the stationary code plate 92 or rotatable disc 94 adjacent thereto.

Each of the stationary code plates 92 and the rotatable code discs 94–1 to 94–4 has a notch 128 at the lead or right end of its code track 96 in which the latching dog 116 is engaged by the biasing action of the spring 120. The notch is sufficiently deep to receive the dog 116 and is sufficiently wide also to accommodate the lateral finger 106 between the face 122 of the dog and wall 130 of the notch. The finger 106 engages the wall 130 during the restoring action of the assembly 22 subsequent to entry of the converted data into the adding machine. When the lever 108 is pivoted in the counterclockwise direction, the latching dog 116 is lifted from the notch and it and the finger 106 may ride along the track 96 until inner face 132 of the dog engages stop shoulder 134 at the opposite or left end of the track. The distance from the notch 128 and the stop shoulder 134 traversed by the dog 116 and the finger 106 corresponds to the code value of 1, 2, 4, or 8, depending upon the length of the track 96 and the decimal digit value assigned to the code. It will be seen from FIG. 2 that the tracks 96 are of varying length, the shortest of the tracks having the code value 1 assigned thereto and the longest of the tracks on the stationary code plate 92 having the code value 8 assigned thereto.

Figure 1:
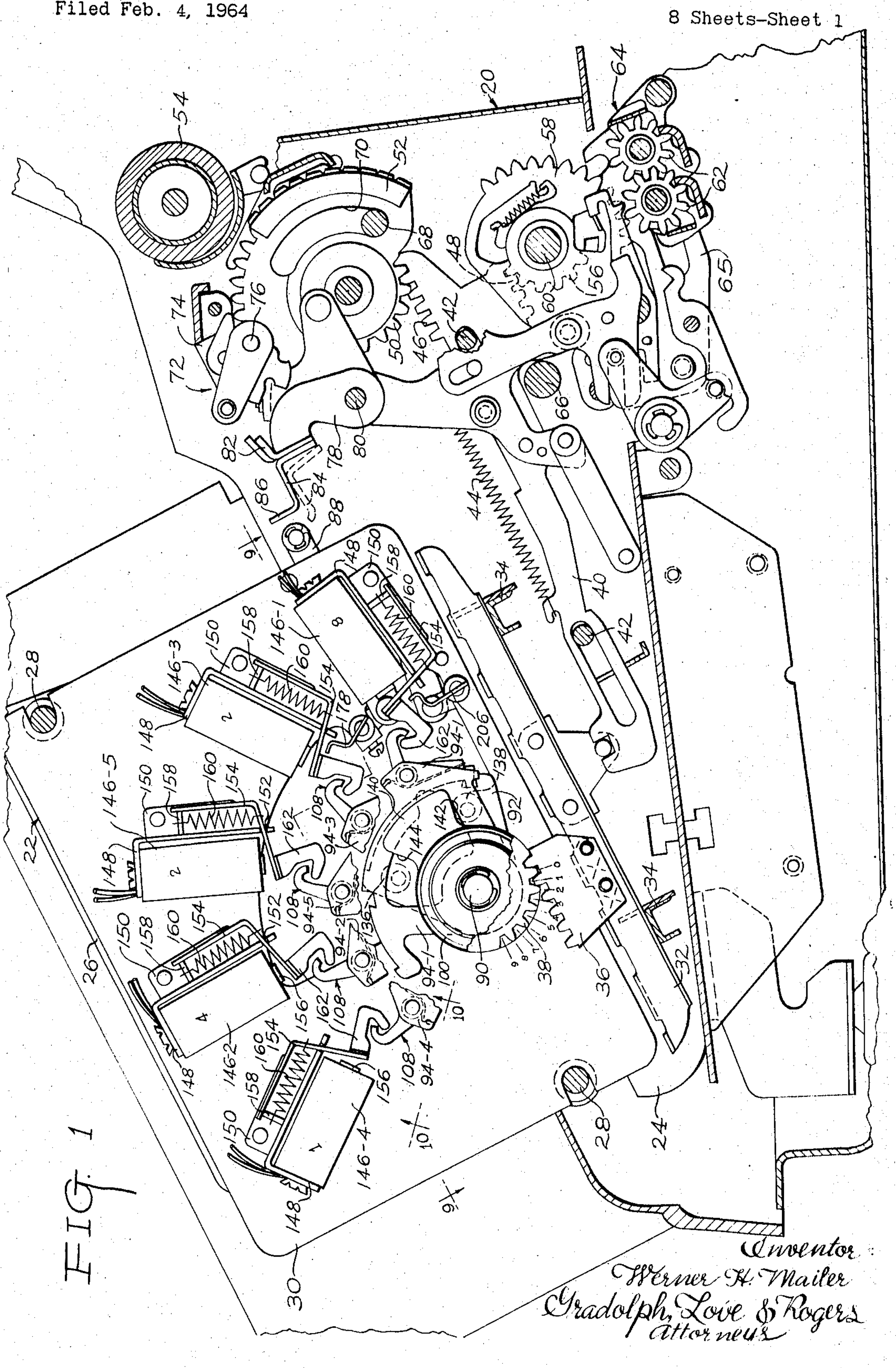

The accumulated movement indicated by the released levers 108 and the travel over the code tracks 96 is transmitted to the rotatable code plate 94–5 which is adjacent the readout gear 38. The code plate 94–5 has a pair of studs 136 and 138 on its outer surface between which projects a cam plate 140 which is integral with the readout gear sector 38. The studs 136 and 138 are positioned on an arc, which has a radius centering on the shaft 90 and which is slightly greater than the distance between opposed edges 142, 144 of the cam plate 140. When the adding machine 20 is in its start or zero-zero position, as shown in FIG. 1, the edge 142 engages and is held against the stud 138 following a cycle and the restoration of all of the pivotally mounted code discs 94 to their 0 position and to engage all of the latching dogs 116 in their respective notches 128. In the ordinary released movement of the stop slide 32, it will travel from the zero-zero position to the indicated 0 position, thus bringing edge 144 of the cam plate 140 against the stud 136, but if none of the dogs 116 has been released, there will be no travel of the stop slide 32 beyond the 0 position and the only indicia that may be printed by the printing sector 52 is the digit 0 for the particular column. However, if one or more of the levers 108 has been tripped, then there is an accumulated value stored in the unit 22 equal to the sum of the codes of the tracks 96 traversed by the released dogs 116, so that as the stop slide 32 moves rearwardly, the gear sector 38 is rotated in the counterclockwise direction from the zero-zero position to the number value indicated by the accumulated code values sensed in the unit. The readout gear sector 38 will therefore govern the extent of rearward movement of the stop slide 32, the movement of the rack bar 40, and the rotational angle imparted to the printing segment 52 and the accumulator transfer gear segments 56 and 58.

There is associated with each of the rotatable code discs 94 an electromagnet 146 which has a suffix of 1, 2, 3, 4, or 5, identifying it with the pivotal rotatable code disc 94 whose mounted lever 108 it is intended to trip. Thus, electromagnet 146–1 is associated with the code disc 94–1, the extent of movement of which is governed by the code track 96–8, etc.

Each electromagnet is carried in a bracket or frame 148 having a flange 150 by which it is mounted to the base plate 30. The bracket 148 is L-shaped and adjacent its forward end is slotted at 152 to receive one leg of an L-shaped armature 154 which cooperates with core 156 of the electromagnet. When the electromagnet is energized, the leg of the armature 154 which extends through the slot is drawn toward the core and its opposite leg is moved away from a stop flange 158 adjacent the rear of the armature. The armature 154 is biased away from the core 156 and against the flange 158 by a spring 160 extending between the flange 158 and the leg of the armature which extends through the slot 152 on the opposite side of the bracket 148 from the armature core 156. The armature is provided with the customary electrical leads which are connected to receive appropriate energizing signals from the output of the unit which reads the binary code and transmits it to the converting and translating assembly 22.

Each armature 154 is provided on its outer face opposite the core 156 with a lever trip hook 162 which is adapted to engage the hooked end 126 of the lever arm 124. When the electromagnet 146 is energized for any of the levers 108, the hook 162 pivots the lever in the counterclockwise direction and releases the latching dog 116 from its notch 128, thereby permitting the pivotally mounted code disc 94 carrying the pivoted lever 108 to move in the counterclockwise direction relative to the code plate 92 or code disc 94 having the notch 128 from which the latching dog 116 is released and the code track 96 on which the released dog 116 and finger 106 ride, until movement is arrested by engagement of the dog face 132 with the stop shoulder 134.

Figure 9:
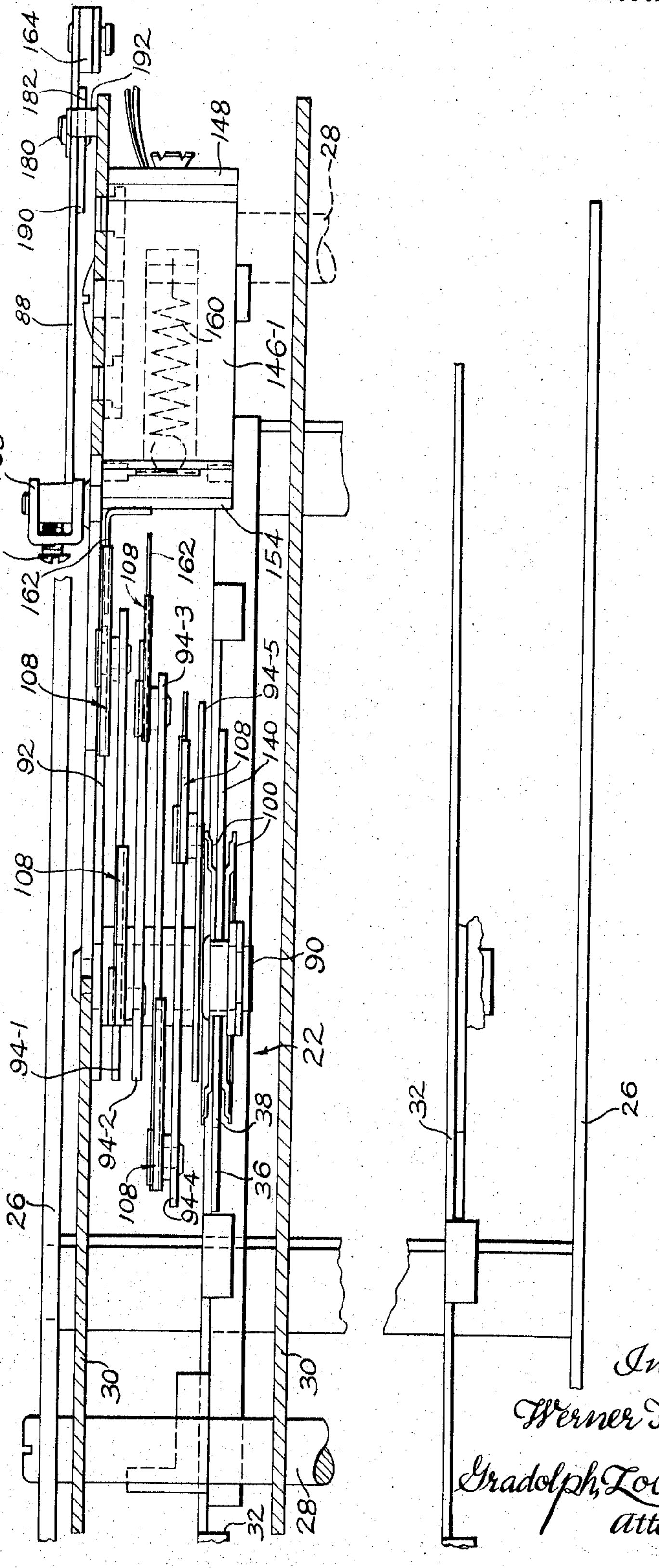
FIG. 9 is an enlarged sectional plan view of one unit of the converting and translating apparatus of the present invention and may be considered as taken along the line 9—9 of FIG. 1, looking in the direction of the arrows.

While the rotatable code discs 94 are illustrated in FIGS. 2 and 9 in numerical order, the bulkiness of the electromagnets 146 and their mounting brackets 148 dictates that they cannot be similarly so mounted and therefore the code numbers corresponding to the rotatable disc numbers indicate the proper position of each of the electromagnets 146 in FIGS. 1 and 11. This random arrangement is shown also in FIG. 10.

In taking a total or subtotal for all of the columns, the stop slides 32 must be free to move to their fullest extent in order that the decimal digit as high as the number 9 be extracted from the accumulator 64 and indicated on the printing segment 52. It has been found preferable to free the output gear segment 38 to the fullest extent and for this the code numbers 8 and 2 are combined, giving a code value of 10, which is one greater than the number 9, the highest to be extracted from the accumulator and printed by the segment 52. The mechanism for releasing the readout gear sector 38 is shown most clearly in FIGS. 11 through 15, and is associated with the total taking mechanism 72 previously described.

The total slide 88 carries a roller 164 on its outer end which bears against the leg 86 of the bracket 84 carried on the arm 78 of the total taking mechanism 72. This roller facilitates the functioning and prevents binding between the parts. At its opposite end the slide 88 is pivotally connected to an arm 166. The arm 166 has its upper end formed in a U-shaped yoke 168 which is secured by a set screw 170 to a pivot pin 172 mounted in a bushing 174 carried in the plate 30. The opposite end of the pin 172 is slotted at 176 to receive in a press fit one end of an ogee-shaped spring 178. The free end of the spring bears against armature 154 of the electromagnet 146–3 and when the slide 88 is moved inwardly of the plate 30 or leftwardly as seen in FIG. 11, the arm 166 pivots in the clockwise direction, pivoting the spring 178 in the clockwise direction and moving the armature 154 toward and against the core 156 of the electromagnet 146–3. Adjustment of the position of the spring 178 relative to the armature 154 is facilitated by the set screw 170 which should not be tightened against the pivot pin 172 until the positioning of the spring is proper.

Between its ends the total slide 88 is pivotally connected at 180 to a lever 182 which is pivoted at its midpoint on a fixed pivot pin 184 carried by the base plate 30. The opposite end of the lever 182 is connected by a pivot pin 186 to a link 188. At its upper end the lever 182 is formed with a finger 190 adapted to engage a stop pin 192 when the total slide 88 is in its projected or FIG. 1 position.

The opposite end of the line 188 from the pivot pin 186 is pivotally connected to an arm 194 which is similar to the arm 166 and is provided with an integral U-shaped yoke 196 carrying a set screw 198 by which the arm is adjustably secured to a pivot pin 200 pivotally mounted in a bushing 202 fixed in the base plate 30. The opposite end of the pin 200 is slotted at 204 to receive an end of ogee spring 206, the free end of which bears against the outer face of the armature 154 for the electromagnet 146–1. It will be noted that when the slide 88 moves leftwardly as seen in FIG. 11, the link moves rightwardly or in the opposite direction, pivoting the arm 194 in the clockwise direction which also pivots the spring 206 in the clockwise direction, thereby moving the armature leg against the core 156 of the electromagnet 146–1. The effect, therefore, of moving the total slide 88 by the total taking mechanism 72 for either a total or subtotal operation is to free the assembly of the code plate and code discs for movement of the readout gear sector 38 for a value equal to the code values of the electromagnets 146–1 and 146–3, respectively, code values 8 and 2, making a total of 10, thereby permitting movement of the stop slide 32 under the control of the amount set up in the accumulator 64 a distance which will read any numerical value set up in the accumulator. Thus, any number from 1 through 9 may be printed on the tape by the printing sector 52 and any value of 1 through 9 may be taken from the accumulator for whatever computation is desired.

The lever 182 is biased in the clockwise direction about its pivot 184 to bring the finger 190 against the stop 192 by a spring 208 which has one end connected to the pivot pin 186 and the other end anchored to the back plate 30. Thus, during the entry of amounts into the adding machine 20 by the converting and translating unit 22, the slide 88 is projected to the right, the link 188 is held in its leftward position, and the springs 178 and 206 are retained in positions which do not affect the normal and magnetic operation of the armatures 154 for the electromagnets 146–1 and 146–3.

Figure 10:
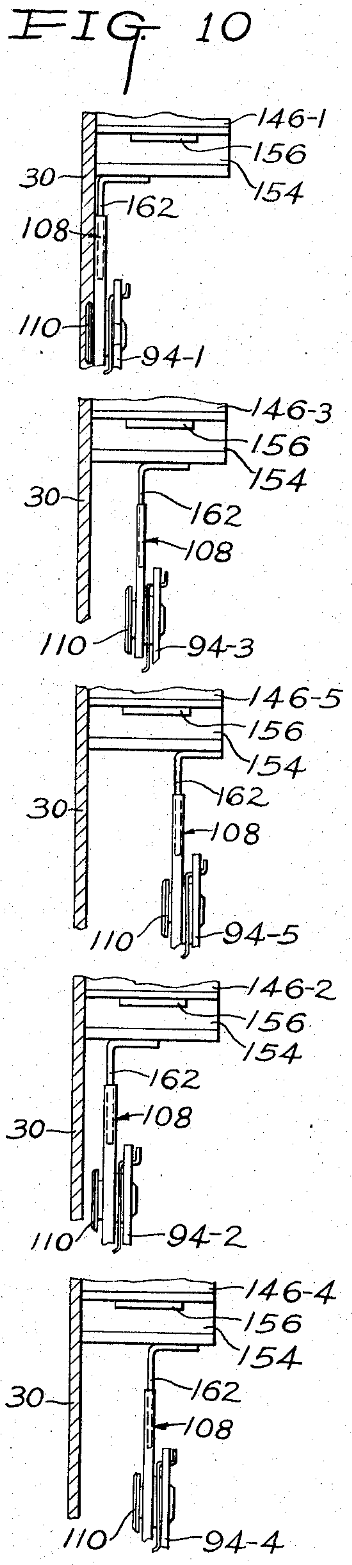
FIG. 10 is an enlarged view, somewhat diagrammatic in nature, showing fragments of the electromagnets and levers to release the five code digit discs.

FIGS. 1 and 11 most clearly show the relationship of the hooked ends 126 of the lever arms 124 and the trip hooks 162. In FIG. 1, none of the armatures has been moved and it should be noted that there is appreciable clearance between the coacting trip hooks 162 and the lever arm hooked ends 126 so that should, for example, only the electromagnet 146–1 be energized, the entire assembly of code discs 94–1 through 94–5 may rotate in the counterclockwise direction a distance corresponding to the length of the code track 96–8. During this rotational movement the untripped levers 108 cannot inadvertently be tripped and the translated value is accurate. This arrangement also facilitates restoration of the assembly during the second half of the machine cycle during which the electromagnets are deenergized, as it is not necessary physically to latch any of the hooked lever ends 126 with its associated trip hooks 162. FIG. 10 shows the staggered arrangement of the levers 108 and trip hooks 162 and the fact that there can be no interference among them during rotation of the assembly in the counterclockwise and clockwise directions. From this description it is also apparent that should the armature 146–3 be energized, only the code discs 94–3, 94–4, and 94–5 will be rotated, and that appropriate combinations can be selected according to the bits of coded information converted.

FIGS. 3 through 8, and to a certain extent FIG. 2, illustrate the manner in which through the proper tripping of the appropriate levers 108 and the release of the corresponding latching dogs 116, a correct accumulated code value corresponding to any of the numerals 1 through 9 may be used to limit the rotational value of the readout gear sector 38 and thus the rearward movement of the stop slide 32 for the purpose of properly positioning the printing sector 52 and the adding and accumulator gear sectors 56 and 58. For the purpose of clarity in FIGS. 3 through 8, only two of the stationary code plate 92 and the pivotally mounted code discs 94 are shown in any figure, and these two are always adjacent or juxtaposed. In these figures the rotational positions of the discs 94 are illustrated in dotted or change position lines in order to indicate the extreme value of the accumulated position provided the designated electromagnets 146 have been energized and the corresponding levers 108 have been tripped to release the dogs 116 thereof from their retaining notches 128 to ride upon the code tracks 96 for the purpose of permitting rotation of the stack of code discs 94 a predetermined arcuate distance and therefore the readout gear a predetermined arcuate distance under the impetus supplied from the stop slide 32 of the adding machine 20.

Figure 3:
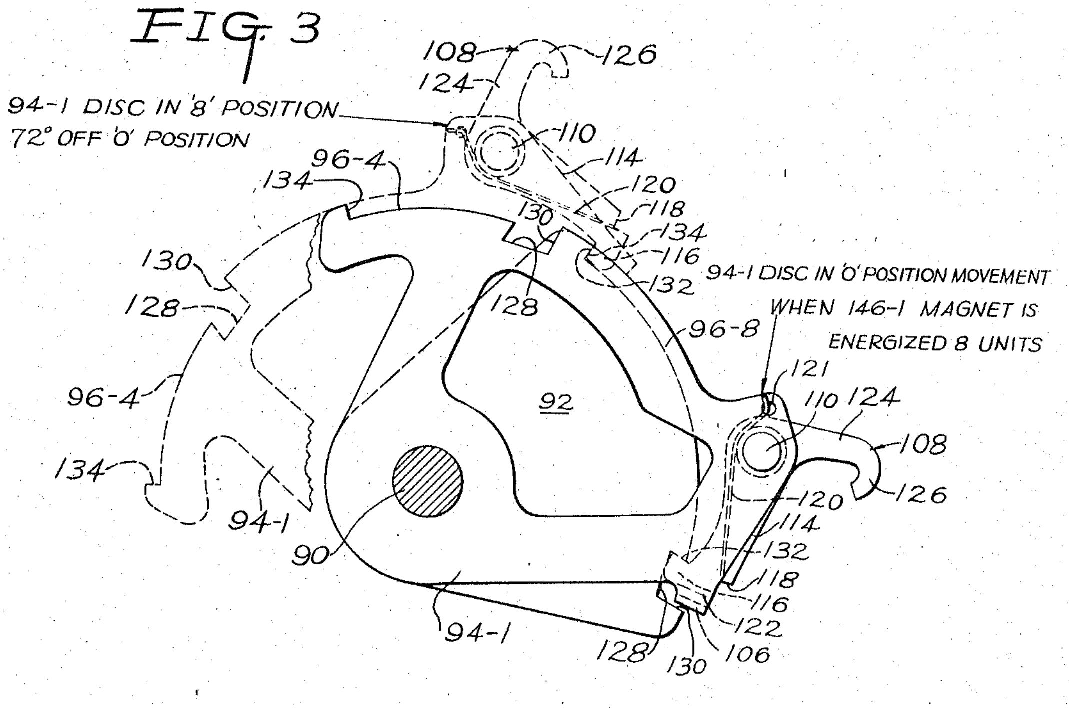
FIG. 3 is an enlarged elevational view of the first code digit disc and the stationary code plate showing the full extent of the disc movement in dotted lines.

In FIG. 3 there is illustrated diagrammatically the code plate 92 and the forwardly positioned juxtaposed code disc 94–1, the latching dog 116 of which rides upon the code track 96–8 which when released will introduce into the accumulated value of the transmitted code the decimal digit 8 by traversing the entire distance of the code track 96–8, thereby permitting the readout gear sector 38 to be rotated a value corresponding to the number 8 by the stop slide 32. The extreme position of the code disc 94–1 is shown in dotted lines in FIG. 1.

Figure 4:
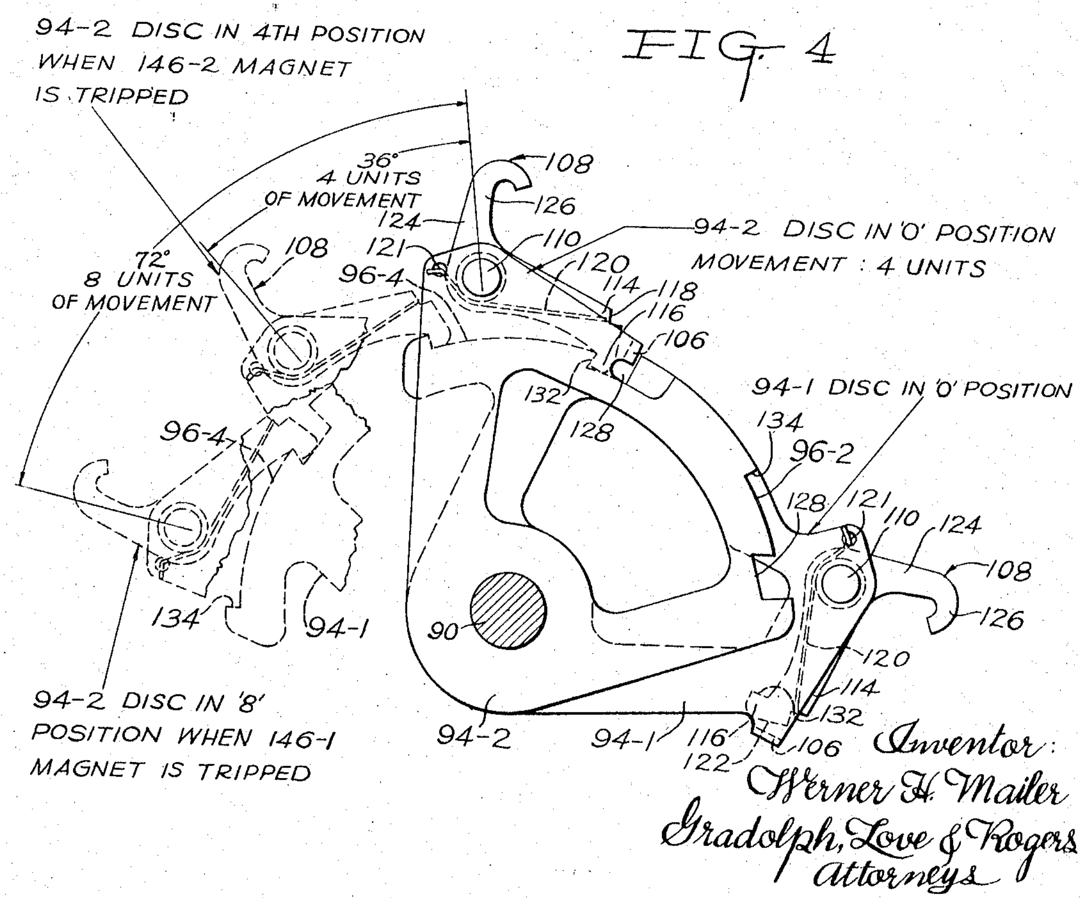
FIG. 4 is an enlarged elevational view of the first and second code digit discs showing in dotted line the movements of which the discs are capable according to code values sensed.

FIG. 4 illustrates the code disc 94–1 and the forwardly thereof positioned code disc 94–2, with the latter shown in the two positions in which it can move, depending upon which electromagnet 146 is energized. In the event the electromagnet 146–1 is energized to trip the lever 108 mounted on the code disc 94–1, the code discs 94–1 and 94–2 are rotated a distance corresponding to the length of the code track 96–8 to the extreme position illustrated in FIG. 4 in dotted lines for the purpose of entering the number 8. Since the track 96–4 of the code disc 94–1 has a value of 4, should the lever 108 on the code disc 94–2 be tripped, the code disc 94–2 would be moved a distance corresponding to the code value 4 relative to code disc 94–1 and code plate 92. It should be clear that no single code disc 94 is moved a distance, relative to its juxtaposed neighbor toward the code plate 92, greater than the value of the track 96 on said neighbor.

Figure 5:
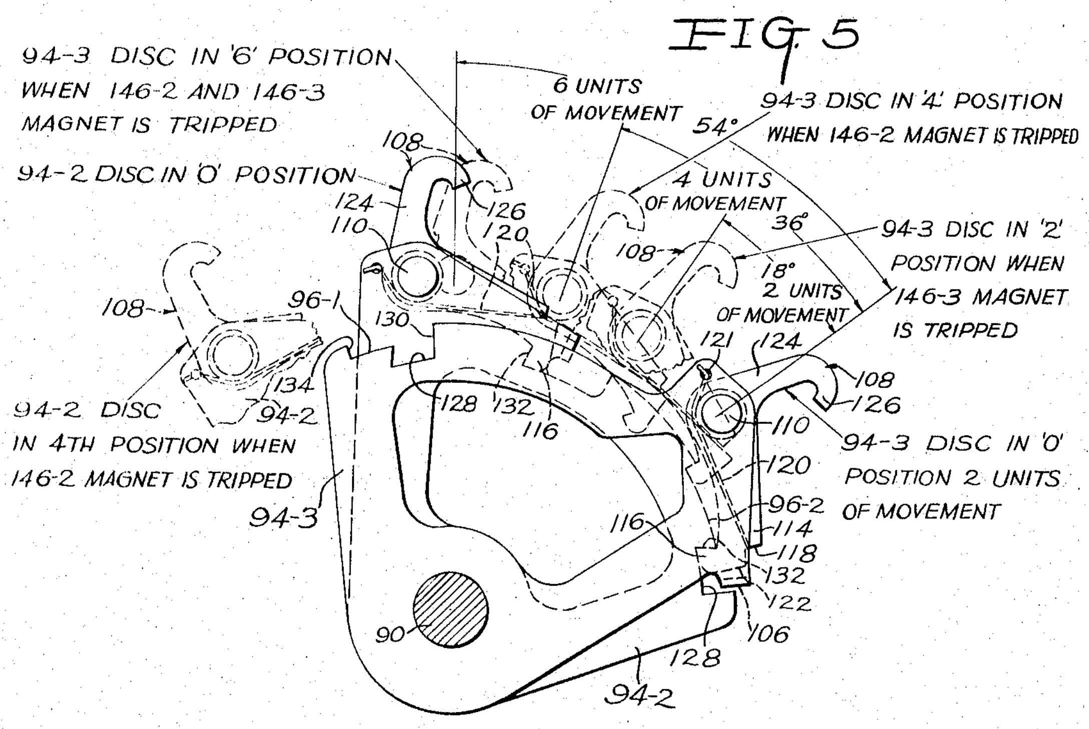
FIG. 5 is an enlarged elevational view of the second and third code digit discs showing in dotted lines the movements of which the discs are capable according to code values sensed.

In FIG. 5 there are shown code discs 94–2 and 94–3 in several positions in which these discs may find themselves, depending upon which of the electromagnets 146 were tripped, it being observed that the relative distance that code disc 94–3 may move relative to code disc 94–2 is the value of code 2, the length of track 96–2. It should be observed in this connection that the armatures 154 of the electromagnets 146–3 and 146–1 will be tripped by movement of the total slide 88 in order to trip the levers 108 mounted on the code discs 94–3 and 94–1 so that the accumulated value of code 2 and code 8 from code tracks 96–2 and 96–8 on code disc 94–2 and code plate 92 may be accumulated for the purpose of permitting the readout gear sector 38 to be moved at least through the accumulated decimal digit 9 and the stop slide 32 rearwardly through at least the number 9 so as to sense any value of the numbers 1 through 9 in the accumulator 64 and transfer this information to the printing sector 52 and for purposes of subsequent calculation should this be desired.

Figure 6:
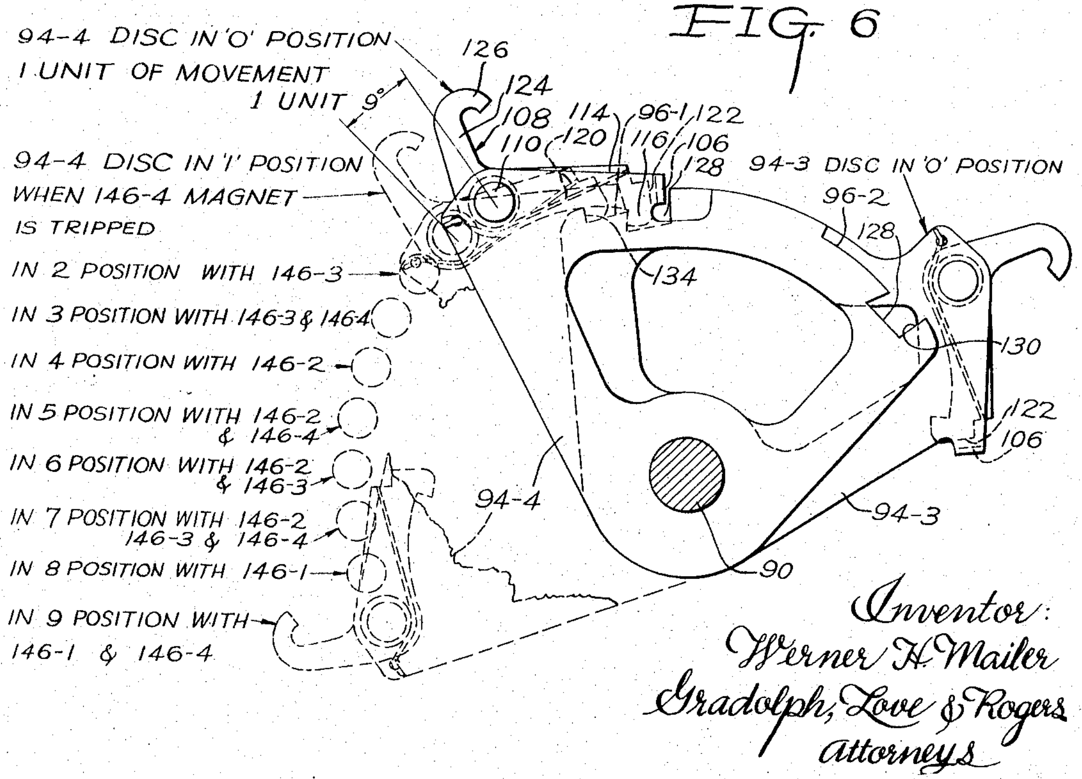
FIG. 6 is an enlarged elevational view of the third and fourth code digit discs showing in dotted lines the movements of which the discs are capable according to code values sensed.
Figure 7:
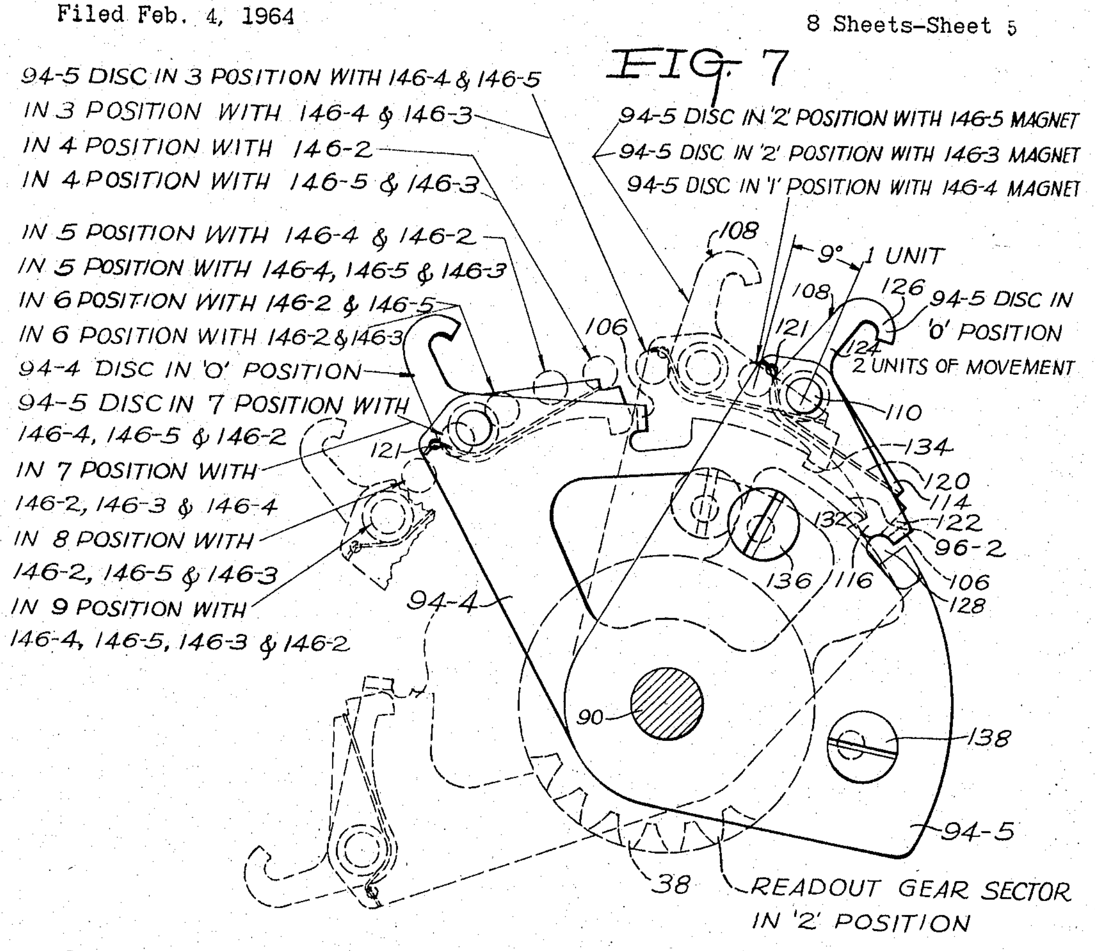
FIG. 7 is an enlarged elevational view of the fourth and fifth discs showing in dotted lines the movements of which the discs are capable according to code values sensed.

In FIGS. 6 and 7 there are shown, respectively, the code discs 94–3 and 94–4 and code discs 94–4 and 94–5 with a variety of changed positions with an indication of which positions are dictated by energization of the various electromagnets 146–1 through 146–5 and combinations thereof, so as to accumulate in the position of the readout gear sector 38 any decimal digit of 1 through 9.

Figure 8:
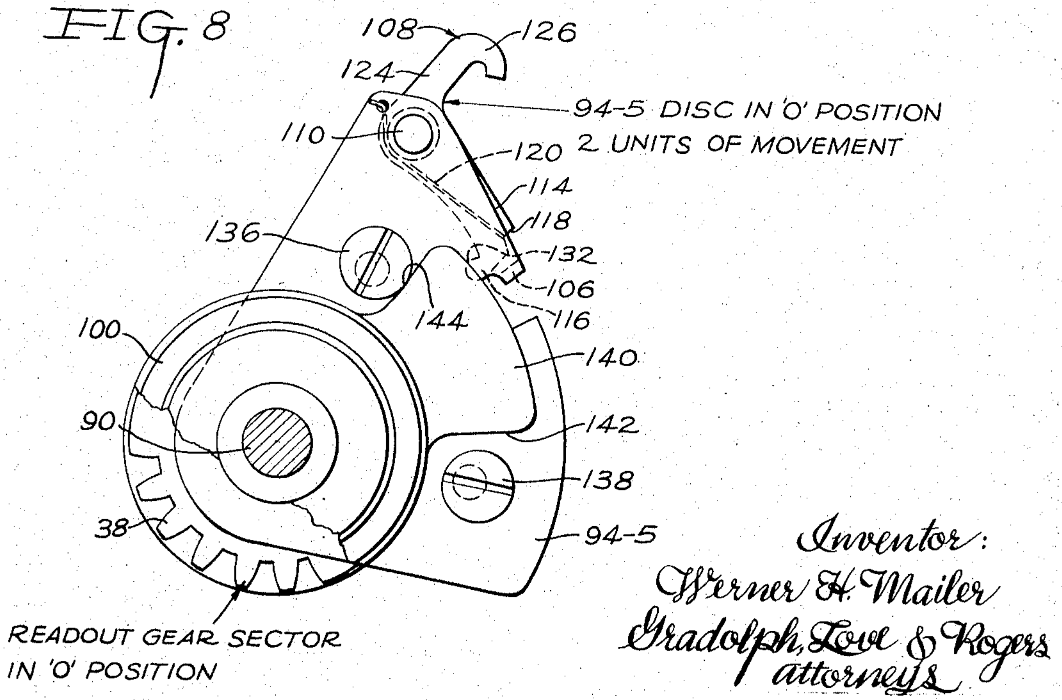
FIG. 8 is an enlarged elevational view of the fifth disc and the readout gear sector in the zero position.

FIG. 8 illustrates the position of the code disc 94–5 and the readout gear segment 38 in the 0 position, that is, the position in which the stop slide 32 has moved rearwardly a distance from the zero-zero position where none of the levers 108 in the translating and converting unit 22 have been tripped by the respective electromagnets 146 and there is no value to be printed on the tape unless it be the value 0. Ordinarily, adding machines of the type illustrated have a zero suppressor mechanism operative to the left of the tens-column or that column wherein a number having the value 1 or greater is to be printed. This zero suppressor mechanism may be omitted should it be desired to print zeros in columns wherein the number 1 or greater is not printed.

From the foregoing it will be appreciated that in the 1, 2, 4, 8 code there would be utilized the code tracks 96–8, 96–4, 96–2, and 96–1 of the code plate 92, code disc 94–1 code disc 94–2, and code disc 94–3, thereby resulting in the release of the code discs 94–1, 94–2, 94–3, and 94–4 and energization of the corresponding electromagnets 146. While using the 1, 2, 2, 4 code the track 96–8 would not be used, and therefore the code disc 94–1 would not be released for rotation. The code discs 94–2, 94–3, 94–4, and 94–5 would be released in order to introduce respectively the code values 4, 2, 1, and 2. Selective combinations thereof would be released in order to produce the decimal digits 1 through 9.

When the total has been accumulated by tripping of the proper levers 108 by the electromagnet 146, then an electromagnet is energized from the source to trip the conventional motor bar, thereby to release the stop slides 32 for travel rearwardly. The distance the stop slides travel as dictated by the accumulated value of the code plate 92 and code discs 94, and as previously described, the rack bar 40 moves rearwardly a corresponding distance to position the printing sector 52 and the adding and accumulator sectors 56 and 58 for proper printing of the indicia upon the tape and the entry of the proper numerical value into the positive or negative sides of the accumulator 64.

On the second half of the adding machine cycle, the bail 68 rotates the gear sector 50 in the clockwise direction to drive the stop slides 32 forwardly to their zero-zero position. This rotates the readout gear sector 38 and any of the released code discs 94 in the clockwise direction, causing the released latching dogs 116 to move clockwise along their respective code tracks until the dogs are snapped into the notches 128 by the springs 120. The assembly 22 is thus positively cleared of any data and is conditioned for a subsequent converting cycle.

During this time, the spring 208 holds the springs 178 and 206 away from the armatures 154 of the electromagnets 146–1 and 146–3 to prevent the release of these electromagnets inadvertently and the tripping of the corresponding levers 108 on the respective code discs 94–1 and 94–3 which would enter into the accumulator and print on the disc a value equivalent to the numeral 9.

When it comes to taking a total or a subtotal, however, the total or subtotal taking mechanism 72 is actuated, the arm 78 is pivoted in the counterclockwise direction, the slide 88 is moved leftwardly to pivot the springs 178 and 206 in the clockwise direction for the purpose of moving the armatures 154 of the electromagnets 146–3 and 146–1, respectively, to trip the levers 108 of the code discs 94–3 and 94–1 for the purpose of releasing the readout gear sector 38 for travel of a distance at least equal to the number 9 for the purpose of extracting from the accumulator 64, in the manner hereinbefore described, a value as high as numeral 9, and transferring this number to the printing segment 52 for the purpose of printing this on the tape as a total or subtotal, depending upon the operation of the adding machine 20 which is indicated.

It will be seen from the foregoing description that the objectives which were claimed for this invention at the outset of this specification are fully attained by the mechanism disclosed, which is straightforward, simple in construction and operation, positive in its action on the return stroke of the machine, and accurate in transmission of data.

While a single embodiment of the invention has been shown and described, it will be apparent that numerous variations and modifications thereof may be made without departing from the underlying principles of the invention. It is intended, therefore, by the following claims, to include within the scope of the invention all such variations and modifications by which substantially the results of the invention may be obtained through the use of substantially the same or equivalent means.

What is claimed as new and desired to be secured by United States Letters Patent is:

1. Apparatus for converting binary code information into a mechanical movement for the entry of a corresponding number into an adding machine of the type having a number stop slide for each decimal column, comprising in combination, a readout gear sector adapted to be meshed with and driven by gear teeth on the adding machine stop slide, a stack of relatively rotatable code elements adjacent said gear sector, means interconnecting said gear sector and the adjacent code element, means on said code elements defining code tracks, the number of code tracks being equal to the total of the different code indicia in the binary codes adapted to be converted, means traversable of said code tracks releasably latching adjacent code elements together for rotation together, and selectively operable means engageable with said latching means to release adjacent code elements for rotation relative to each other the extent permitted by the appropriate code track.

2. Apparatus for converting binary code information into a mechanical movement for the entry of a corresponding number into an adding machine of the type having a number stop slide for each decimal column, and a total taking mechanism, comprising in combination, a readout gear sector adapted to be meshed with and driven by gear teeth on the adding machine stop slide, a stack of relatively rotatable code elements adjacent said gear sector, means interconnecting said gear sector and the adjacent code element, means on said code elements defining code tracks, the number of code tracks being equal to the total of the different code indicia in the binary codes adapted to be converted, means traversable of said code tracks releasably latching adjacent code elements together for rotation together, selectively operable means engageable with said latching means to release adjacent code elements for rotation relative to each other the extent permitted by the appropriate code track, and a total release slide adapted to be operated by the adding machine total taking mechanism and mounted to operate a sufficient number of said selectively operable means to release code elements permitting said readout gear sector a rotational movement equal at least to the number 9.

3. Apparatus for converting binary code information into a mechanical movement for the entry of a corresponding number into an adding machine of the type having a number stop slide for each decimal column, comprising in combination, a readout gear sector adapted to be meshed with and driven by gear teeth on the adding machine stop slide, a stack of relatively rotatable code elements adjacent said gear sector, means interconnecting said gear sector and the adjacent code element, means on said code elements defining code tracks, the number of code tracks being equal to the total of the different code indicia in the binary codes adapted to be converted, means traversable of said code tracks releasably latching adjacent code elements together for rotation together, means at one end of each code track engaged by said latching means in latched position, stop means at the opposite end of each code track to limit the relative rotational movement, and selectively operable means engageable with said latching means to release adjacent code elements for rotation relative to each other the extent permitted by the appropriate code track.

4. Apparatus for converting binary code information into a mechanical movement for the entry of a corresponding number into an adding machine of the type having a number stop slide for each decimal column, comprising in combination, a readout gear sector adapted to be meshed with and driven by gear teeth on the adding machine stop slide, a stack of relatively rotatable code elements adjacent said gear sector, means on said code elements defining code tracks, the number of code tracks being equal to the total of the different code indicia in the binary codes adapted to be converted, each of said code tracks having a finger projecting thereacross from the adjacent code element and with which it is integral, a stop at one end of each code track to limit the relative rotational movement of the adjacent ones of said code elements, a notch at the opposite end of each code track, a lever pivotally mounted on each of the code elements having a finger and having a latching dog engageable in said notch in the adjacent of the code elements to restrain relative movement therebetween, spring means biasing each lever to latching position, selectively operative means engageable with said levers to lift the appropriate latching dogs out of their restraining notches so that said lifted dogs and released code element fingers may ride on the adjacent code track to be arrested against the stop at the opposite end thereof, and lost motion means interconnecting said readout gear sector and the code element adjacent thereto.

5. Apparatus for converting binary code information into a mechanical movement for the entry of a corresponding number into an adding machine of the type having a number stop slide for each decimal column, and a total taking mechanism, comprising in combination, a readout gear sector adapted to be meshed with and driven by gear teeth on the adding machine stop slide, a stack of relatively rotatable code elements adjacent said gear sector, lost motion means interconnecting said gear sector and the adjacent code elements, means on said code elements defining code tracks, the number of code tracks being equal to the total of the different code indicia in the binary codes adapted to be converted, each of said code tracks having a finger projecting thereacross from the adjacent code element to which said finger is fixed, a stop at one end of each code track to limit the relative rotational movement of the adjacent ones of said code elements, a notch at the opposite end of each code track, a lever pivotally mounted on each of the code elements having a finger and having a latching dog engageable in said notch of the adjacent of the code elements to restrain relative movement therebetween, spring means biasing each lever to latching position, selectively operable means engageable with said levers to lift the appropriate latching dogs out of their restraining notches so that said lifted dogs and released fingers may ride on the adjacent code track to be arrested against the stop at the opposite end thereof, and a total release slide adapted to be operated by the adding machine total taking mechanism and mounted to operate a sufficient number of said selectively operable means to release code elements permitting said readout gear sector a rotational movement equal at least to the number 9.

6. Apparatus for converting binary code information into a mechanical movement for the entry of a corresponding number into an adding machine of the type having a number stop slide for each decimal column, comprising in combination, a readout gear sector adapted to be meshed with and driven by a rack on the adding machine stop slide, a stack of code elements adjacent said gear sector with that element most remote from said sector held stationary and the remainder rotatable relative thereto and to each other, a lost motion connection between said gear sector and the code element adjacent thereto, a finger carried by each of said rotatable code elements and projecting toward and across the periphery of the adjacent code element toward said stationary code element, the periphery of each of said code elements except the one adjacent said readout gear sector being formed with a recessed code track across which said projecting finger from the adjacent code element rides, a stop at one end of each code track to limit the relative movement of said elements with respect to said adjacent element, a notch at the opposite end of each code track, a lever pivotally mounted on each rotatable code element and having a latching dog engageable in said notch in said adjacent element to restrain relative movement therebetween, spring means biasing each lever to latching position, and selectively electrically energizable means engageable with each lever to disengage its latching dog from the restraining notch so that the code element carrying said tripped lever and the code element on which it is mounted may be rotated relative to the juxtaposed code element a distance limited by the length of the code track on said last mentioned code element.

7. Apparatus for converting binary code information into a mechanical movement for the entry of a corresponding number into an adding machine of the type having a number stop slide for each decimal column, comprising in combination, a readout gear sector adapted to be meshed with and driven by gear teeth on the adding machine stop slide, a stationary code plate, a plurality of code discs interposed between said code plate and said gear sector, a finger carried by each of said code discs and projecting toward and across the periphery of the adjacent code disc toward said code plate, the finger on the code disc adjacent said code plate projecting toward and across the periphery of said code plate, the periphery of each of said code plate and said interposed code discs except the one adjacent said readout gear sector being formed with a recessed code track on which said projecting finger from the adjacent code disc rides, a stop at one end of each code track to limit the relative movement of said discs with respect to said adjacent code plate or the adjacent code disc, a notch at the opposite end of each code track, a lever pivotally mounted on each code disc and having a latching dog engageable in said notch in said adjacent code plate or the adjacent code disc to restrain relative movement therebetween, spring means biasing each lever to locking position, each lever having a projecting hooked arm, selectively electrically energizable means having a trip hook engageable with said hooked arms to lift the appropriate latching dogs out of the restraining notches so that said lifted dogs may ride on the adjacent code track to be arrested against the stop at the opposite end thereof, and lost motion means interconnecting said readout gear sector and said code disc adjacent thereto.

8. Apparatus for converting binary code information into a mechanical movement for the entry of a corresponding number into an adding machine of the type having a number stop slide for each decimal column, and a total taking mechanism comprising in combination, a readout gear sector adapted to be meshed with and driven by gear teeth on the adding machine stop slide, a stationary code plate, a plurality of code discs interposed between said code plate and said gear sector, a lost motion connection between said readout gear section and the adjacent code disc, a finger carried by each of said code discs and projecting toward and across the periphery of the adjacent code disc toward said code plate, the finger on the code adjacent said code plate projecting toward and across the periphery of said code plate, the periphery of each of said code plates and said interposed code discs except the one adjacent said readout gear sector being formed with a recessed code track on which said projecting finger from the adjacent code disc rides, a stop at one end of each code track to limit the relative movement of said discs with respect to said adjacent code plate or the adjacent code disc, a notch at the opposite end of each code disc and having a latching dog engageable in said notch in said adjacent code plate or the adjacent code disc to restrain relative movement therebetween, spring means biasing each lever to locking position, each lever having a projecting hooked arm, selectively energizable electromagnetic means having an armature carrying a trip hook engageable with said hooked arms to lift the appropriate latching dogs out of the restraining notch so that said lifted dogs may ride on the adjacent code track to be arrested against the stop at the opposite end thereof, and a total release slide assembly actuated by the adding machine total taking mechanism to move the armatures of a sufficient number of said electromagnetic means whereby the released code discs may permit said readout gear sector to be pivoted through an arc corresponding at least to the number 9.

References Cited

UNITED STATES PATENTS

| | | | |
|---|---|---|---|
| 2,741,427 | 4/1956 | Drake | 235—61 |
| 2,955,755 | 10/1960 | Bradshaw | 235—61 |
| 3,018,039 | 1/1962 | Parker | 235—61 |
| 3,028,080 | 4/1962 | Schwend | 235—58 |
| 3,250,464 | 5/1966 | Caspari | 235—61 |
| 3,255,960 | 6/1966 | Maples | 235—61 |

RICHARD B. WILKINSON, *Primary Examiner.*

S. A. WAL, *Assistant Examiner.*